United States Patent [19]
Kolaian et al.

[11] 3,976,682
[45] Aug. 24, 1976

[54] NOVEL SALTS AND METHOD OF PREPARATION

[75] Inventors: Jack H. Kolaian, Wappingers Falls; John A. Patterson, Fishkill; Frank K. Ward, Hopewell Junction, all of N.Y.

[73] Assignee: Texaco Inc., New York, N.Y.

[22] Filed: Aug. 5, 1974

[21] Appl. No.: 494,590

[52] U.S. Cl............................ 260/501.11; 106/14; 106/288 Q; 252/387
[51] Int. Cl.²........................................ C07C 101/24
[58] Field of Search................................ 260/501.11

[56] References Cited
UNITED STATES PATENTS 2,468,012  4/1949  Isbell............................ 260/501.11
2,840,600  5/1958  Du Brow et al. .............. 260/501.11

OTHER PUBLICATIONS

D. W. Adamson, "J. Chem. Soc.," pp. 885–890 (1950).

Primary Examiner—James O. Thomas, Jr.
Assistant Examiner—G. Breitenstein
Attorney, Agent, or Firm—T. H. Whaley; C. G. Ries; George J. Darsa

[57] ABSTRACT

Novel secondary alkylammonium 3-secondary alkylaminoalkanoates are provided along with a method for preparing same by reacting a secondary alkyl primary amine and an alkenoic acid in the presence of an alcohol. The compounds have utility as freeze-thaw additives for paints, corrosion inhibitors, pigment grinding aids and paraffin inhibitors.

10 Claims, No Drawings

NOVEL SALTS AND METHOD OF PREPARATION

This invention relates to novel alkylammonium salts. In particular, this invention relates to novel secondary alkylammonium secondary alkylaminoalkanoate salts and to a method for preparing the same.

Heretofore, certain alkylammonium salts have been prepared employing a two step process. In the initial stage a primary alkyl primary amine was reacted with an alkenoic acid to produce the corresponding N-aliphatic-beta-amino alkanoic acid. In the second stage, the amino acid was neutralized with a suitable base such as sodium hydroxide, potassium hydroxide or specific amines. We have found that the prior procedure is unsuitable for preparing our novel salts in that no reaction occurs when a secondary alkyl primary amine is contacted with an alkenoic acid.

A method has now been discovered whereby novel secondary alkylammonium secondary alkylaminoalkanoate salts can be produced from secondary alkyl primary amines and alkenoic acids. Moreover, the salts prepared by our process can be produced in relatively high yields and purities under the conditions more fully described below.

It is therefore an object of this invention to provide novel compounds.

Another object of this invention is to provide a method for preparing the novel compounds.

Yet another object of this invention is to provide a method for preparing the novel compounds in a single step.

A further object of this invention is to provide a method for preparing the novel salts in high purity.

Other objects and advantages will become apparent from a reading of the following detailed description and examples.

SUMMARY OF THE INVENTION

Broadly, this invention contemplates as new compounds, secondary alkylammonium 3-secondary alkylaminoalkanoates where the alkyl constituents of the compound have from 6 to 25 carbon atoms. The compounds provided by the instant invention correspond to formula:

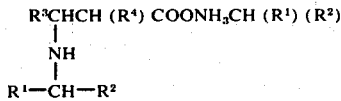

where $R^1$ and $R^2$ are alkyl groups having from 1 to 23 carbon atoms, where the sum of $R^1$ and $R^2$ equals from 5 to 24 carbon atoms and where $R^3$ and $R^4$ are hydrogen or alkyl groups of from 1 to 3 carbons. Illustrative of the secondary alkylammonium 3-secondary alkylaminoalkanoates provided by this invention we mention secondary ($C_6$) alkylammonium 3-secondary ($C_6$) alkylaminopropionate, secondary ($C_7$) alkylammonium 3-secondary ($C_7$) alkylaminobutanoate, secondary ($C_{10}$) alkylammonium 3-secondary ($C_{10}$) alkylaminobutanoate, secondary ($C_{11}$) alkylammonium 3-secondary ($C_{11}$) alkylaminopentanoate, secondary ($C_{14}$) alkylammonium 3-secondary ($C_{14}$) alkylaminobutanoate, secondary ($C_{16}$) alkylammonium 3-secondary ($C_{16}$) alkylaminopentanoate, secondary ($C_{18}$) alkylammonium 3-secondary ($C_{18}$) alkylaminohexanoate, secondary ($C_{22}$) alkylammonium 3-secondary ($C_{22}$) alkylaminobutanoate and secondary ($C_{25}$) alkylammonium 3-secondary ($C_{25}$) alkylaminohexanoate. The salts can be of substantially uniform composition or salt compositions having mixed chain lengths also fall within the purview of this invention as for example where the alkyl group is a mixture having from 10 to 14 carbons or 14 to 15 carbons or 16 to 22 carbons. Illustrative of the mixtures of salts contemplated we mention secondary ($C_{10}$–$C_{14}$) alkylammonium 3-secondary ($C_{10}$–$C_{14}$) alkylaminopropionate, secondary ($C_{10}$–$C_{14}$) alkylammonium 3-secondary ($C_{10}$–$C_{14}$) alkylaminobutanoate, secondary ($C_{10}$–$C_{14}$) alkylammonium 3-secondary ($C_{10}$–$C_{14}$) alkylamino-2-methylpropionate, secondary ($C_{10}$–$C_{14}$) alkylammonium 3-secondary ($C_{10}$–$C_{14}$) alkylamino-2-methylbutanoate, secondary ($C_{14}$–$C_{15}$) alkylammonium 3-secondary ($C_{14}$–$C_{15}$) alkylaminopropionate, secondary ($C_{14}$–$C_{15}$) alkylammonium 3-secondary ($C_{14}$–$C_{15}$) alkylaminobutanoate, secondary ($C_{16}$–$C_{22}$) alkylammonium 3-secondary ($C_{16}$–$C_{22}$) alkylaminobutanoate, and secondary ($C_{16}$–$C_{22}$) alkylammonium 3-secondary ($C_{16}$–$C_{22}$) alkylaminopentanoate.

According to this invention, the contemplated ammonium salts are prepared in a single step by reacting a secondary alkyl primary amine and an alkenoic acid in the presence of an alcohol. The presence of the alcohol is essential inasmuch as no reaction occurs between the amine and the acid in the absence of the alcohol. In contrast thereto primary alkyl primary amines and alkenoic acids have been found to react in the absence of an alcohol.

In accordance with this invention the secondary alkyl primary amines contemplated as one of the reactants in the single step method have from 6 to 25 carbon atoms. Mixtures of amines can be employed including those having from 10 to 14, or 14 to 15 or 16 to 22 carbon atoms. In general, the amines correspond to the formula:

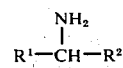

where $R^1$ and $R^2$ are as defined above. Included as amines applicable in the instant method, we mention positionally isomeric amines, 2 or 3-aminohexane, 2,3, or 4-aminoheptane, 2,3 or 4-aminooctane, 2,3,4 or 5-aminodecane, 2,3,4,5 or 6-aminoundecane, 2,3,4,5 or 6-aminododecane, 2,3,4,5,6 or 7-aminotridecane 2,3,4,5,6 or 7-aminotetradecane, 2,3,4,5,6,7,8 or 9-aminooctadecane and mixtures thereof. In addition, mixtures of secondary $C_{10}$–$C_{14}$ alkylamines or secondary $C_{14}$–$C_{15}$ alkylamines or secondary $C_{16}$–$C_{22}$ alkylamines containing mixtures of positionally isomeric amines are contemplated. Such amines are provided by contacting a $C_6$–$C_{25}$ paraffin hydrocarbon, preferably a straight chain hydrocarbon, in a liquid phase with a vaporous nitrating agent, illustrated by nitrogen dioxide or nitric acid, at a temperature ranging from about 250° to 500°F. and pressures of from 1 to 20 atmospheres to provide secondary mono-nitroparaffins. The nitroparaffins are thereafter hydrogenated to the corresponding secondary alkyl primary amine in the presence of a hydrogenation catalyst and at temperatures of from about 100° to 450°F.

The alkenoic acids contemplated in the method of this invention have from 3 to 9 carbon atoms. Mixtures of acids can also be employed. In general, 2-alkenoic acids are employed and correspond to the formula:

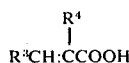

where $R^3$ and $R^4$ are as defined above. Included as acids employed in the instant method we mention propenoic acid, 2-methylpropenoic acid, 2-butenoic acid, 2-methyl-2-butenoic acid, 2-ethyl-2-butenoic acid, 2-isopropyl-2-butenoic acid, 2-pentenoic acid, 2-methyl-2-pentenoic acid, 2-n-propyl-2-pentenoic acid, 4-methyl-2-pentenoic acid, 2-hexenoic acid and 2-methyl-2-hexenoic acid. Preferred acids are propenoic acid, 2-methylpropenoic acid, 2-butenoic acid and 2-pentenoic acid.

We have found a method whereby an alkenoic acid and secondary alkyl primary amine can be reacted to form a secondary alkylammonium 3-secondary alkylaminoalkanoate which comprises reacting the amine and acid in the presence of an alcohol at a temperature of from about 50° to about 180°C., preferably, from about 100° to 150°C. at pressures of from atmospheric to 200 p.s.i.g., preferably 50 to 100 p.s.i.g. for periods ranging from a few minutes to 24 hours or longer. Applicable alcohols include primary or secondary alkanols of from 1 to 10 carbons and we prefer to employ alcohols of from 1 to 6 carbons including methanol, ethanol, propanol, butanol, pentanol or hexanol. Particularly preferred are the primary alcohols methanol, ethanol and propanol. The mole ratio of the acid to amine to alcohol employed in the method is advantageously between about 1:1.3:2.0 and 1:3.0:20 and preferably between about 1:1.5:5.0 and 1:2.5:10. An excess of amine can be employed so as to provide optimum yields of the desired product. However, the critically important aspect of the ratio is the presence of the alkanol during the reaction. If the ratio of the acid to alkanol is subsequently below 1:2, severely diminished yields of desired product results or no reaction takes place. The ratio of acid to alkanol in excess of that set out above and as high as 1:100 can be employed and does not deleteriously affect the reaction.

At the completion of the reaction a mixture of desired product, unconverted reactants and alcohol is recovered. Unreacted amine is separated from the mixture by contacting the mixture with carbon dioxide, water and a liquid hydrocarbon having from 4 to 8 carbons, suitably a paraffin hydrocarbon such as pentane or hexane, thereby forming and separating the resulting aqueous and hydrocarbon layers. The hydrocarbon layer contains the desired secondary alkylammonium 3-secondary alkylaminoalkanoate, some alcohol and the aqueous layer contains amine carbonate and alcohol. The product in the hydrocarbon layer is recovered by removing the hydrocarbon and alcohol as by, for example, mild vacuum stripping. In those instances where unreacted alkenoic acid is also present in the reaction product mixture, it may be desirable to initially neutralize the mixture with an aqueous solution of a suitable base, such as sodium or potassium hydroxide, prior to contacting with carbon dioxide and the liquid hydrocarbon.

The secondary alkylammonium 3-secondary alkylaminoalkanoates provided by this invention are useful as freeze-thaw additives for latex emulsion paints, corrosion inhibitors, pigment grinding aids for oil base paints and paraffin inhibitors. In latex emulsion paints, especially the styrene-butadiene types, successive freezing and thawing of the water base paint leads to rheological deterioration of the emulsion and the paint is irreversibly destroyed. By introducing our novel salt as an additive into the paint, the loss of large volumes of paint due to freezing and thawing is mitigated. The novel compounds are also suitable to disperse pigment more finely into oil base paints containing alkyl resins. Further in operations involving oil production, corrosion of production equipment by sour crude is minimized by the use of our novel salts as corrosion inhibitors.

In order to more fully illustrate the nature of our invention and the manner of practicing the same, the following examples are presented.

EXAMPLE I

In a one liter reactor 25.8 grams of 2-butenoic acid (0.3 mole) and 92.5 grams of secondary ($C_{10}$–$C_{14}$) alkyl primary amine (0.5 mole) in 96 grams of methanol (3.0 mole) were reacted at 100°C. and about 50 p.s.i.g. for 40 hours. Infrared analysis of the reaction mixture indicated the formation of secondary ($C_{10}$–$C_{14}$) alkylammonium 3-secondary ($C_{10}$–$C_{14}$) alkylaminobutanoate.

To the reaction mixture there was added approximately 200 milliliters of 2 molar sodium hydroxide thereby resulting in the formation of an emulsion which separated into two layers. After drawing off the bottom layer, water and methanol were stripped to yield 5.5 grams of sodium butenoate. The upper layer was stripped of some water and methanol leaving a product consisting of the ammonium salt, unreacted amine and water. Conversion to the ammonium salt was calculated to be about 80 percent basis the recovery of unreacted 2-butenoic acid as sodium butenoate.

A small portion of the product was charged with excess carbon dioxide, water and pentane thereby converting the unreacted amine to the amine carbonate. An emulsion formed which with continued charging of carbon dioxide separated into two layers. The pentane extract was drawn off and the pentane removed yielding a viscous amber fluid which was identified by analysis to be secondary ($C_{10}$–$C_{14}$) alkylammonium 3-secondary ($C_{10}$–$C_{14}$) alkylaminobutanoate. The elemental analysis of the product based on weight percent found: carbon 72.0, hydrogen 12.4 and nitrogen 6.1. The product also comprised 2.0 percent water and 0.17 percent ash.

A sample of the product was evaluated as a freeze-thaw additive for latex paints according to the procedure set out in ASTM D 2243-64T. The test consisted of comparing a latex paint with and without additive after successive freeze-thaw cycles for seven days, the duration of each freeze period being 12 hours. The viscosities, in centipoise, were determined by direct count of the elapsed time per 100 paddle revolutions at a specific driving weight and use of predetermined time-viscosity calibration curves for Stormer instruments to convert instrument readings directly to viscosity. The measurements were made with a modified General Purpose Stormer Viscometer, ASTM D562, and the effectiveness of the freeze-thaw additive was determined by noting the deterioration in fluidity of the paint after the freeze-thaw cycle as compared to the initial paint viscosity. The temperature of freezing was −15°C. and of thawing at normal room temperature. Sample A consisted of 90 grams of untreated latex paint and Sample B consisted of 90 grams of latex paint to which 1.35 grams of secondary ($C_{10}$–$C_{14}$) alkylammonium 3-secondary ($C_{10}$–$C_{14}$) alkylaminobutanoate were added. The Stormer value for the latex paint prior to initial freezing was 26.0 seconds per 100 revolutions. Table I sets forth the instrument readings in seconds per 100 revolutions. The numbers in parenthesis indicate the instrument driving weight in grams.

TABLE I

| Cycle Sample | 1 | 2 | 3 | 4 | 5 | 6 | 7 | 8 |
|---|---|---|---|---|---|---|---|---|
| A | 29.3 (50) | 41.2 (100) | 188 (50) | 204 (100) | 297 (100) | 360 (100) | 512 (100) | 400 (100) |
| B | 28.5 (50) | 29.5 (50) | 31 (50) 20 (100) | 30 (50) 19 (100) | 30 (50) 20 (100) | 30.5 (50) 20 (100) | 32 (50) 20.5 (100) | 32.5 (50) 20.5 (100) |

As can be seen from Table I, the effectiveness of the ammonium salt in preventing deterioration of the latex paint was very pronounced.

EXAMPLE II

To a one liter pressure reactor, there was introduced 192 grams of methanol (6.0 moles), 51.6 grams of 2-butenoic acid (0.6 mole) and 185 grams of secondary ($C_{10}$–$C_{14}$) alkyl primary amine (1.0 mole) and the mixture reacted for 12 hours at 135°C. and 80 p.s.i.g. 165 grams of secondary ($C_{10}$–$C_{14}$) alkylammonium 3-secondary ($C_{10}$–$C_{14}$) alkylaminobutanoate was recovered and identified by infrared analysis and corresponded to a yield of about 60 mole percent.

EXAMPLE III

To a one liter reactor, there was introduced 8.6 grams of 2-butenoic acid (0.1 mole) and 37.2 grams of secondary ($C_{11}$) alkyl primary amine (0.2 mole). After refluxing for 20 hours at 140° to 160°C. infrared analysis showed that no reaction occurred.

In another reactor, 8.6 grams of 2-butenoic acid (0.1 mole) and 37.2 grams of secondary ($C_{10}$–$C_{14}$) alkyl primary amine (0.2 mole) were refluxed at 150°–160°C. for 26 hours. Infrared analysis showed no reaction occurred. Likewise, refluxing 8.6 grams of butenoic acid (0.1 mole) and 37.2 grams of secondary ($C_{10}$–$C_{14}$) alkyl primary amine (0.2 mole) in 100 ml. of toluene for 10 hours at 110°C. resulted in no reaction.

EXAMPLE IV

To a one liter reactor, there was introduced 8.6 grams of 2-butenoic acid (0.1 mole) and 37.2 grams of primary ($C_{12}$) alkyl primary amine (0.2 mole) and refluxed at 165°C. for 4 hours. Infrared analysis showed that reaction took place and that primary ($C_{12}$) alkylammonium 3-primary ($C_{12}$) alkylaminobutanoate was formed.

In another reactor, 8.6 grams of 2-butenoic acid (0.1 mole) and 37.2 grams of primary ($C_{18}$) alkyl primary amine (0.2 mole) were refluxed at 140°–160°C. for 4 hours. Infrared analysis indicated that some primary ($C_{18}$) alkylammonium 3-primary ($C_{18}$) alkylaminobutanoate was formed.

EXAMPLE V

To a one liter reactor, there was introduced 12.8 grams of 2-butenoic acid (0.15 mole), 47.0 grams of secondary ($C_{14}$–$C_{15}$) alkyl primary amine (0.25 mole) and 48 grams of methanol (1.5 mole) and the mixture was refluxed at 70°C. Infrared analysis showed the production of secondary ($C_{14}$–$C_{15}$) alkylammonium 3-secondary ($C_{14}$–$C_{15}$) alkylaminobutanoate.

We claim:
1. A secondary alkylammonium 3-secondary alkylaminoalkanoate corresponding to the formula:

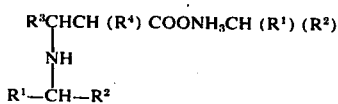

where $R^1$ and $R^2$ are alkyl groups having from 1 to 23 carbon atoms, where the sum of $R^1$ and $R^2$ equals from 5 to 24 carbon atoms and where $R^3$ and $R^4$ are hydrogen or alkyl groups of from 1 to 3 carbons.

2. An ammonium alkanoate according to claim 1 wherein said alkyl constituents have from 10 to 14 carbon atoms.

3. An ammonium alkanoate according to claim 1 wherein said alkyl constituents have from 14 to 15 carbon atoms.

4. An ammonium alkanoate according to claim 1 wherein said alkyl constituents have from 16 to 22 carbon atoms.

5. An ammonium alkanoate according to claim 1 wherein said alkanoate constituent has from 3 to 9 carbon atoms.

6. A secondary ($C_6$) alkylammonium 3-secondary ($C_6$) alkylaminopropionate according to claim 1.

7. A secondary ($C_{10}$–$C_{14}$) alkylammonium 3-secondary ($C_{10}$–$C_{14}$) alkylaminobutanoate according to claim 1.

8. A secondary ($C_{11}$) alkylammonium 3-secondary ($C_{11}$) alkylaminobutanoate according to claim 1.

9. A secondary ($C_{14}$–$C_{15}$) alkylammonium 3-secondary ($C_{14}$–$C_{15}$) alkylaminobutanoate according to claim 1.

10. A secondary ($C_{16}$–$C_{22}$) alkylammonium 3-secondary ($C_{16}$–$C_{22}$) alkylaminobutanoate according to claim 1.

* * * * *